F. BRELLE, Sr. & F. BRELLE, Jr.
MACHINE FOR CUTTING RUBBER GASKETS.
APPLICATION FILED JUNE 21, 1913.
1,107,404.
Patented Aug. 18, 1914.
3 SHEETS—SHEET 1.
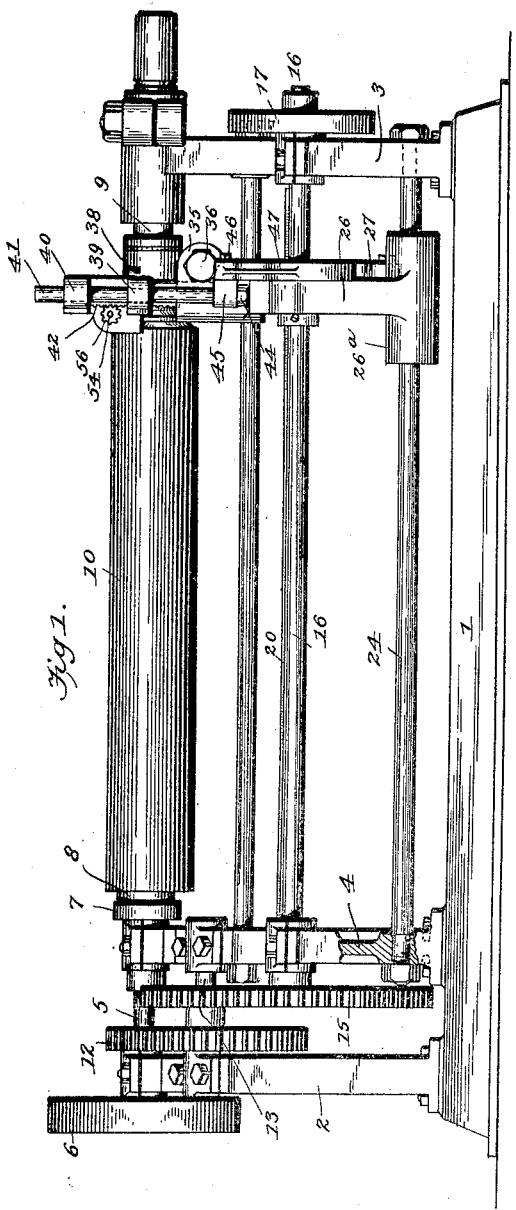
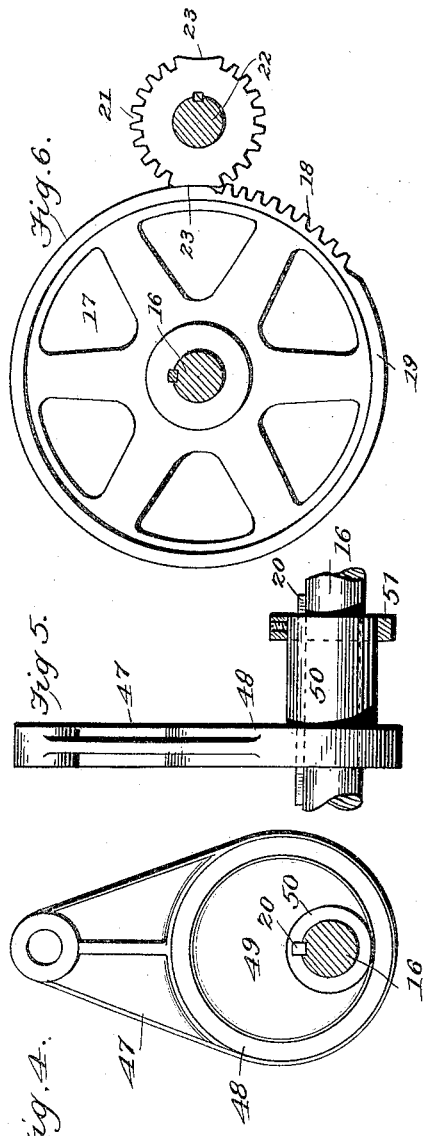
Frank Brelle, Sr.
Frank Brelle, Jr.
INVENTORS
WITNESSES
BY
ATTORNEY

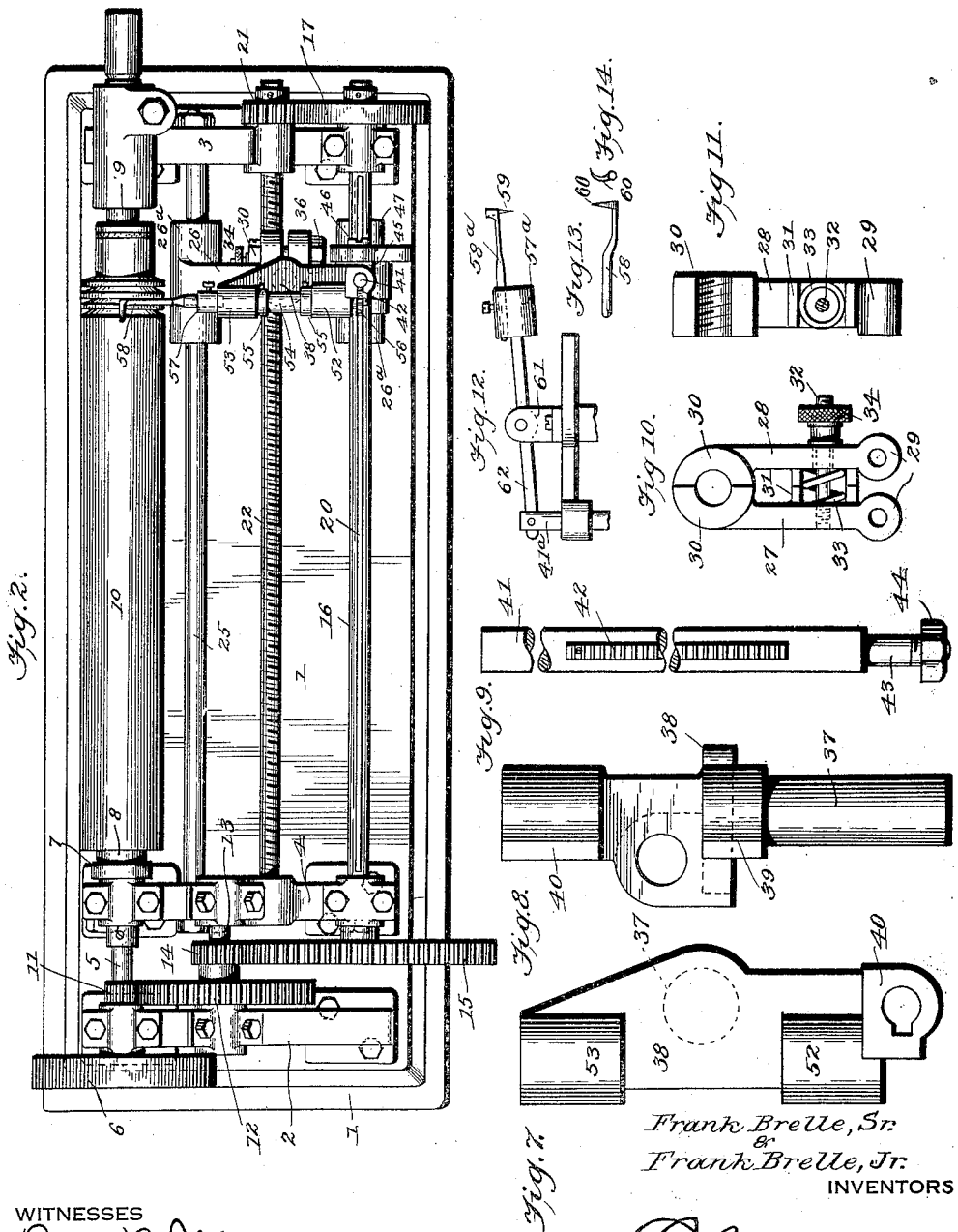

F. BRELLE, Sr. & F. BRELLE, Jr.
MACHINE FOR CUTTING RUBBER GASKETS.
APPLICATION FILED JUNE 21, 1913.
1,107,404.
Patented Aug. 18, 1914.
3 SHEETS—SHEET 3.
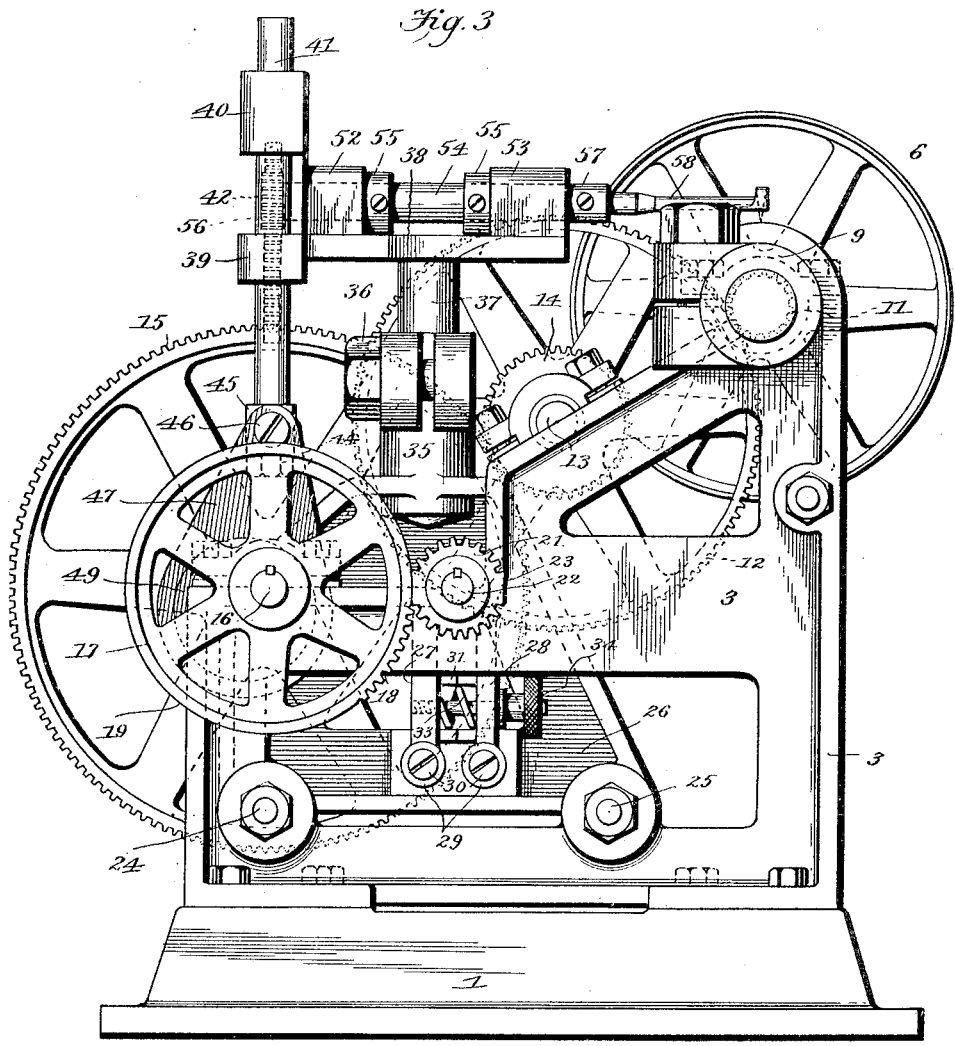
Frank Brelle, Sr.
&
Frank Brelle, Jr.
INVENTORS

UNITED STATES PATENT OFFICE.

FRANK BRELLE, SR., AND FRANK BRELLE, JR., OF FERNDALE, CALIFORNIA.

MACHINE FOR CUTTING RUBBER GASKETS.

1,107,404.  Specification of Letters Patent.  Patented Aug. 18, 1914.

Application filed June 21, 1913. Serial No. 775,110.

*To all whom it may concern:*

Be it known that we, FRANK BRELLE, Sr., and FRANK BRELLE, Jr., citizens of the United States, residing at Ferndale, in the county of Humboldt and State of California, have invented a new and useful Machine for Cutting Rubber Gaskets, of which the following is a specification.

This invention has reference to improvements in machines for cutting rubber and other like gaskets, particularly such as are employed for sealing fruit jars and for packing joints.

In accordance with the present invention there is provided a lathe-like structure having feeding and cutting mechanism constructed to operate automatically and to be utilized for cutting rubber rings for fruit jars where the rings are flat or in substantially one plane throughout, or where the rings are slightly curved in cross section, so as in some instances to include an arc approaching ninety degrees.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawing, but may be changed and modified so long as such changes and modifications mark no material departure from the salient features of the invention.

In the drawings:—Figure 1 is a front elevation of the machine. Fig. 2 is a plan view thereof. Fig. 3 is an end elevation. Fig. 4 is a face view of an eccentric employed in the structure. Fig. 5 is an edge view of the structure of Fig. 4 and showing the eccentric mounted on a drive shaft. Fig. 6 is a view of an intermittent actuating gear employed in the machine. Figs. 7 and 8 are views of part of a tool rest. Fig. 9 is a view of a reciprocating bar employed on the tool rest. Figs. 10 and 11 are views of a feed nut structure on the tool carriage. Fig. 12 is a view of a modified form of tool carrier. Figs. 13 and 14 are side and end views of a cutting tool which may be employed for forming curved gaskets.

Referring to the drawings, there is shown a base 1 on which is erected end frames 2 and 3 and an intermediate frame 4.

Mounted in the end frame 2 and intermediate frame 4 is a drive shaft 5 on one end of which is secured a pulley 6 and at the other end a chuck 7 of any suitable form designed to engage one end of a roller 8, the other end of which is engaged by a tail stock 9 mounted in the frame 3. As these parts may be all of ordinary form, detail showing or description thereof is deemed unnecessary. The roller 8 is designed to carry a tube 10 ordinarily of soft rubber, but which may be of any material suited for the purposes of the present invention, hence the term rubber is to be understood throughout this specification as not only referring to rubber *per se*, but to any suitable material.

On the shaft 5 is a pinion 11 meshing with a gear wheel 12 on a countershaft 13 journaled in and extending between the frames 2 and 4, and this countershaft carries a pinion 14 in mesh with a gear wheel 15 on a shaft 16 journaled at one end of the frame 4 and at the other end in the frame 3 and beyond the latter the shaft 16 carries a mutilated gear wheel 17 shown separately in Fig. 6 as provided with a short length of gear teeth 18, while the remainder of the periphery is smooth, as indicated at 19. The shaft 16 is provided with a longitudinal key or spline 20 which may be approximately as long as the part of the shaft between the frames 3 and 4. The mutilated gear 17 is arranged to engage a mutilated pinion 21 on a screw shaft 22 journaled in the frames 3 and 4 and the pinion 21 has a suitable number of teeth to agree with the teeth 18 of the gear wheel 17 and is also provided with diametrically opposed rest spaces 23 conforming in curvature to the curvature of the smooth part 11 of the mutilated gear 17. The arrangement is such that at each rotation of the gear 17 the pinion 21 is driven one-half a rotation, this being in accordance with the particular construction shown in the drawings, although, of course, other proportions may be adopted, but it is desirable that the screw shaft 22 upon which the gear wheel 21 is keyed shall have an intermittent rotative movement imparted to it, while the shaft 5 and drum 8 driven thereby rotate continuously.

Extending between the frames 3 and 4 are suitably spaced guide rods 24, 25, respectively, upon which is mounted a frame 26 having elongated sleeves 26ª surrounding the rods 24 and 25 to slide thereon and at the same time provide an extended bearing, so that the frame 26 which constitutes the carriage of the structure, may be moved from one end of the structure to the other, or to any desired extent along the rods 24, as may be desired. To accomplish the progressive movement of the carriage 26 there is a feed nut provided comprising two arms 27, 28, each formed at one end with an eye 29 traversed by a screw 30 entering a suitable part of the carriage frame 26, while the other ends of the arms 27 and 28 are formed into matching half nuts 30 adapted to the feed screw 22. The arms 27 and 28 have matching lugs 31 determining the approach of the two halves 30 of the feed nut, so that it may at no time be made to bind too tightly upon the feed screw 22. Fast to the arm 27 and extending through the arm 28 is a threaded rod 32 surrounded between the two arms by a spring 33 tending to force the arms apart, while a thumb nut 34 applied to the rod 32 serves to force the arms together against the action of the spring 33. This permits an operator to couple up the carriage to the feed screw 22 or to disconnect it therefrom, so far as feed is concerned, by a suitable manipulation of the thumb nut 34.

The frame 26 is provided at the upper end with a clamp sleeve 35 controlled by a screw or bolt 36 and entering this sleeve is a stem 37 formed at the upper end with a plate or table 38 projecting oppositely from the stem 37 and at one end the table 38, which is substantially horizontal, has erected thereon spaced bearings 39, 40, in which there is mounted a rod 41 for longitudinal reciprocation, this rod being shown separately in Fig. 9, and is provided with a longitudinally disposed rack bar 42. That end of the rod 41 which in action constitutes the lower end is reduced as shown at 43, and is threaded for the reception of a nut 44. The reduced end 43 of the rod 41 has secured thereto a block 45 receiving a screw 46 constituting a pivot connection for one end of a pitman 47, the other end of which is expanded into an eccentric strap 48 housing an eccentric 49 mounted on the shaft 16, and being held thereto for rotation by the spline 20, but capable of sliding therealong. The eccentric 49 is provided with an elongated hub 50 of a length to pass through the frame 26 and is held thereto by a set collar 51 on the end of the hub remote from the eccentric 49, so that the eccentric will travel with the frame 26 and may rotate without interference from said frame.

Formed on the table 38 are spaced bearings 52, 53 in which is mounted a shaft 54, being held against longitudinal movement by set screws 55 between the bearings 52 and 53. One end of the shaft 54 carries a pinion 56 in mesh with the rack gear 42, while the other end of the shaft is provided with a chuck 57 in which may be lodged the shank of a tool 58, the other end of which is formed into or carries a cutter designed to operate upon the rubber tube 10 to cut flat or other shaped rings therefrom, and the cutter may be a plain straight cutter, as indicated at 59 in Fig. 12, or may have a curvature as indicated at 60 in Figs. 13 and 14.

With the structure so far described, and with a cutter such as indicated at 60, the tool 58 is given a rotative movement by the action of the cam pitman 47 upon the rod 41 and the latter in turn partially rotates the shaft 54, so that the cutting end of the tool describes an arc of a circle in a direction to enter the rubber tube 10 and move in a curved path therein toward one end of the tube. Considering the tube as being rotated at a high speed and the cutter as moving thereinto at a suitable speed, a ring is cut off of the tube, but having a certain curvature in cross section agreeable to the path of the cutting part of the tool. The parts are so timed in movement that while this cutting action is taking place, the tool carriage is quiescent, being held by the blank portion 19 of the gear wheel 17 in engagement with one of the blank or rest portions 23 of the pinion 21. As soon as the cutting is finished and the tool is returned to its inactive position by the action of the cam pitman, the teeth 18 are brought into contact with the teeth of the pinion 21 and the latter is rotated a sufficient distance to cause the screw shaft 22 to feed the carriage a distance agreeable to the thickness of the rings to be cut, whereupon the carriage is again locked in the quiescent position and the tool is again operated to cut a ring.

Where flat rings are to be cut, the shaft 54 is omitted and the rod 41 is omitted, these parts being replaced by a rod 41$^a$ shown in Fig. 12, but actuated in the same manner as the rod 41, while instead of the bearings 52 and 53 for the shaft 54 the table 38 carries a bracket 61 upon which is pivoted a lever 62 connected at one end to the rod 41$^a$ and at the other carrying a chuck 57$^a$ adapted to receive the tool 58$^a$ with a cutting point 59 as already referred to. With this arrangement the cutting point 59 simply enters the rubber tube in a plane substantially perpendicular to its longitudinal axis, and rings of even diameter and plane throughout are cut off from the rubber tube.

When it is desired to move the carriage in the reverse position the split nut is released from the screw shaft, whereupon the carriage is easily moved along the guide rods until the desired retracted position is reached.

In practice the rubber tube is rotated about five hundred times a minute, and the parts are so proportioned that ten turns of the roller will be sufficient for the cutting of one gasket, so that twenty-five gaskets per minute may be made on a machine constructed substantially as illustrated.

What is claimed is:—

1. In a machine for the purpose described, means for holding and continuously rotating a rubber tube, a cutter, means for intermittently feeding the cutter lengthwise of the rubber tube, and means for continuously moving the cutter into and away from the rubber tube, the movement into the rubber tube being timed to occur during the periods of rest of feed of the cutter lengthwise of the tube.

2. In a machine for the purpose described, a holder for a rubber tube, means for rotating said holder, a feed screw, reduced motion driving means between the driving means for the rubber tube and the feed screw, said means including a mutilated gear for imparting intermittent motion to the feed screw, a tool carriage having means for connecting it to the feed screw, a tool holder on the tool carriage, means for imparting a rotatable movement to the tool holder in reverse directions, and a tool adapted to the tool holder and provided with a cutting blade of a length and shape to enter the rubber tube in a curved path to sever rings therefrom curved in the direction of the longitudinal axis of the tube.

3. In a machine for the purpose described, a rotatable holder for a rubber tube, a feed screw, and driving means for imparting rotative movement to the rubber tube holder and the feed screw, said driving means including a mutilated gear having a portion of its periphery smooth, and a pinion having teeth on its periphery separated by smooth portions on diametrically opposite sides, the teeth and smooth portions of the pinion being related to the teeth and smooth portion of the gear to cause a further rotative movement of the pinion for each complete rotation of the gear.

4. In a machine for the purpose described, a tool carriage, supporting and feeding means therefor, a reciprocable rod carried by the tool carriage, an eccentric pitman carried by the tool carriage and connected to the rod, an eccentric also carried by the carriage in engagement with the eccentric pitman, means for imparting rotative movement to the eccentric, and a tool carrier connected to the rod to receive movements in opposite directions therefrom.

5. In a machine for the purpose described, a tool carriage, supporting and feeding means therefor, a reciprocable rod carried by the tool carriage, an eccentric pitman carried by the tool carriage and connected to the rod, an eccentric also carried by the carriage in engagement with the eccentric pitman, means for imparting rotative movement to the eccentric, and a tool carrier connected to the rod to receive movements in opposite directions therefrom, the tool carrier being in the form of a rock shaft and provided with a pinion and the reciprocable rod being provided with a rack meshing with the pinion.

6. In a device for the purpose described, a tool carriage, a feed screw therefor, and connections between the tool carriage and feed screw comprising two pivoted arms in opposition and each including a half nut, a clamping means between the arms for holding the nut in engagement with the screw, a spring between the arms for forcing the nut apart and limiting means on the arms preventing binding approach of the half nuts.

In testimony, that we claim the foregoing as our own, we have hereto affixed our signatures in the presence of two witnesses.

FRANK BRELLE, Sr.
FRANK BRELLE, Jr.

Witnesses:
S. G. TOMPKINS,
A. LAURET.

---

Copies of this patent may be obtained for five cents each, by addressing the "Commissioner of Patents, Washington, D. C."